United States Patent [19]
Van Mullem

[11] 4,444,230
[45] Apr. 24, 1984

[54] TANK-MOUNTED FILLING DEVICE

[75] Inventor: Pieter M. E. Van Mullem, Tienen, Belgium

[73] Assignee: "Valico", personenvennootschap met beperkte aansprakelijkheid, Belgium

[21] Appl. No.: 341,209

[22] Filed: Jan. 21, 1982

[30] Foreign Application Priority Data

Jan. 23, 1981 [NL] Netherlands ........................ 8100326

[51] Int. Cl.[3] ...................... B65B 57/00; F16K 21/18; F16K 31/18

[52] U.S. Cl. .................................... 141/198; 137/415; 137/430; 137/449; 137/614.2; 251/44

[58] Field of Search ............................ 251/29, 44, 46; 141/1-12, 37-67, 192-229, 285-310; 137/210, 412-415, 430, 442, 444, 446, 449, 614.2, 628

[56] References Cited

U.S. PATENT DOCUMENTS 4,305,422 12/1981 Bannink ............................ 141/198

*Primary Examiner*—Houston S. Bell, Jr.
*Attorney, Agent, or Firm*—Stevens, Davis, Miller & Mosher

[57] ABSTRACT

The housing of the filling device mounted on the tank wall defines a chamber wherein a spring-activated cut-off valve is mounted. This valve comprises a head cooperating with a valve seat at the end of a supply duct opening into the chamber and a piston-forming body separating the chamber into two volumes. The housing presents openings between the tank inner volume and the frontmost chamber volume, and a duct between the backmost chamber volume and the tank inner volume. A no-return valve, which only lets liquid to the tank inner volume, is mounted in this duct. At the end of this duct a valve controlled by the float in the tank is mounted.

8 Claims, 2 Drawing Figures

TANK-MOUNTED FILLING DEVICE

BACKGROUND

This invention relates to a tank-mounted filling device particularly for liquefied gas, which comprises a housing mounted in the tank wall which housing is provided with a chamber and a supply duct opening therein whereon the supply line may be connected, and comprises a cut-off valve which is arranged inside said chamber, which valve has a head which cooperates with a valve seat on the duct end and closes off said duct with the end thereof in the closing position, but still leaves free in said position a space about said head in the chamber, said space extending down to the closed duct end, and has a piston-forming body which separates said space about the head from a backmost volume lying on that valve side removed from the duct, which valve is provided with a second duct which runs lengthwise through the body and the head thereof and brings the backmost chamber volume into communication with the supply duct even in the valve cut-off position, which housing is moreover provided with at least one opening which brings the tank inner volume into communication with said space about the head and in the valve open position, also with the supply duct, and is provided with a third duct which brings the backmost chamber volume into communication with the tank inner side, which filling device comprises a spring which pushes the cut-off valve to the closing position, and comprises a valve controlled by a float mechanism inside said tank, which is mounted inside the third duct in the housing and cuts off said duct when the liquid inside the tank has reached a determined level.

Such a filling device is known from Belgian Pat. No. 871,180. In this device inside that duct which runs cross-wise through the cut off valve, is mounted a one-way valve which only lets liquid flow to the chamber backmost volume. When filling the tank, due to the pressure in the supply line being higher than the pressure inside the tank, not only the cut-off valve is open but also said one-way valve is open. The largest portion from the supplied liquid flows through openings which open on the chamber frontmost volume, into said tank. A smaller portion flows through that duct which runs cross-wise through the cut-off valve, and the third duct provided in said housing, to the tank. When the desired level, that is generally 80% from the contents for tanks for liquefied gas, has been reached, the supply is automatically stopped. The float mechanism then never holds the third duct open any more. Thereby the pressure inside the backmost volume inside said chamber, which no more communicates with the tank inner side, will rise until the cut-off valve is pushed back to the closed position by the spring acting thereon. At the same time, the one-way valve inside that duct running through said cut-off valve, will also be pushed to the closed position by a spring acting thereon. Due to both the cut-off valve and the one-way valve lying in the closed position, a relatively high pressure still remains active in the backmost volume of said chamber. There results that said known filling device cannot be used for draining liquid from the tank. Indeed when the drain cock is opened and consequently a low pressure is caused inside the supply duct, neither the cut-off valve nor the one-way valve will open as the pressure inside the backmost chamber volume is higher, namely equal to the pressure inside the gas tank when that valve controlled by the float mechanism inside the third duct from the filling device is open, and even higher still when with the highest liquid level inside the tank, said duct is still closed.

To be able to drain or draw off, a tank which is provided with such a known filling device, has to be provided with a special drain device which does of course increase the tank cost.

The invention has for object to obviate this drawback and to provide a tank-mounted filling device which does not only allow filling but also draining fluid from the tank through said supply duct.

THE INVENTION

For this purpose, the device comprises a one-way valve which is mounted between said float mechanism-controlled valve and said chamber inside the housing, inside said third duct and which only lets fluid flow to the inner side of said tank, while the duct provided length wise through the cut-off valve is free from any valve.

In a particular embodiment of the invention, the piston-forming body of said cut-off valve is thicker than the head thereof, while the chamber inside said housing has a smaller portion for the valve head and a larger portion for the valve body, whereby the transition between both portions is so located that when the valve lies in closed position, the body still lies with the head-side projecting side some slight distance away from the transition from the small portion to the large portion of said chamber.

Preferably the head is provided over the whole circumference thereof with a rib which meets the chamber inner wall, said opening which opens on that chamber volume lying around said head, opens into said volume on the side of said supply duct relative to said rib in the closed position of the valve, while said housing is provided with at least one additional opening which on the other side relative to the rib, as considered in the closed position of the valve, opens on that chamber portion which lies on the head side relative to the body.

Other details and advantages of the invention will stand out from the following description of a tank-mounted filling device according to the invention; this description is only given by way of example and does not limit the invention; the reference numerals pertain to the accompanying drawings.

DRAWINGS

In both figures, the same reference numerals pertain to the same elements.

DESCRIPTION OF A PREFERRED EMBODIMENT

Figure 1:
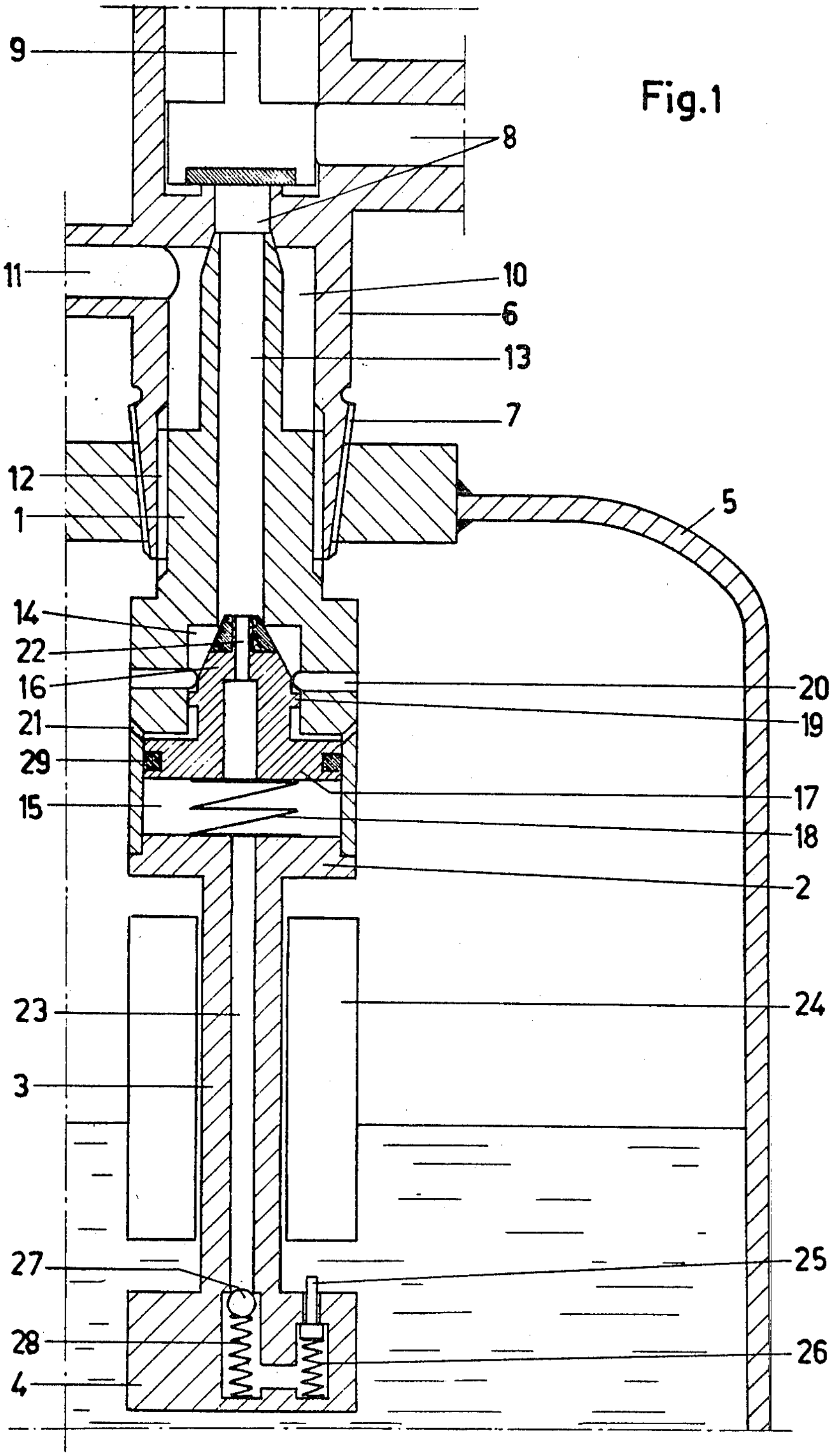
FIG. 1 shows a cross-section through part of a tank provided with a filling device according to the invention.

The filling and draining device as shown in FIG. 1 comprises an oblong housing which is comprised of an oblong head 1, a thick body 2 connecting thereto, an oblong tail 3 connecting to body 2, and a thicker end 4 of said tail. For structural reasons, said housing is made in two parts which are screwed together at the location of body 2.

Said head 1 is screwed into a connecting part 6 provided outside the tank 5 for liquefied gas, in such a way that the free end thereof connects to the end of a discharge and supply duct 8 which runs through said connecting part 6. The connecting part 6 proper is screwed with the tapered end thereof which surrounds head 1, into an opening 7 in a thicker portion of the wall of tank 5. In said discharge and supply duct 8 is mounted a cock 9. Said duct 8 connects as well to a drain line not shown in the figure, as to a mouth piece not shown in the figure, whereon a filling line may be connected in a known way.

Said connecting part 6 forms around the front and smaller portion of head 1, between the screw-connection thereof with said head 1 and the connection of said head 1 to the discharge and supply duct 8, a ringlike volume 10 which communicates on the one hand through a duct 11, with a safety valve not shown in FIG. 1 and on the other hand through grooves 12 which are provided in the screw-threaded outer wall of the thicker portion of head 1, with the inner side of tank 5.

Length-wise through said head 1 runs a supply and discharge duct 13 which on the one hand communicates with said discharge and supply duct 8, and on the other hand connects to the frontmost portion 14 with smaller diameter of a round chamber 14, 15 which is arranged inside body 2.

Inside said chamber 14, 15 lies a cut-off valve which is comprised of a round head 16 and a round wider body 17. Said body 17 lies inside chamber portion 15 and forms a piston. Said body 17 is provided therefore with a groove along the circumference thereof, wherein a sealing ring 29 is arranged. The body 17 thus does not fill completely said portion 15 from chamber 14, 15, in such a way that on the back side of body 17, that is the side removed from duct 13, there remains free a backmost volume inside which is arranged a spring 18 which pushes the cut-off valve to the closed position.

The head 16 of the cut-off valve 16, 17 has a tapered end which in said closed position, partly enters the end connecting chamber 14, 15, with the supply and discharge duct 13. Said latter end of duct 13 thus forms a seat for the cut-off valve. That part connecting to the tapered end of head 16 has a diameter which is smaller than the diameter of part 14 of the chamber, in such a way that even in closed position, some volume of chamber portion 14 remains free around said head 16. The length of head 16 is such that in the closed position of cut-off valve 16,17, thus when the tapered end of head 16 is pressed against the valve seat, that side facing duct 13 of that portion of body 17 projecting outside head 16, still lies some distance away from the projection which is formed in the location of the transition from portion 14 to portion 15 of chamber 14,15.

To guide head 16 during the sliding of cut-off valve 16,17 inside chamber 14, 15, said head is further provided next to the tapered end thereof, with a rib 19 which meets the inner side of chamber portion 14.

Said chamber 14, 15 further communicates with the inner side of tank 5 through two series of openings 20 and 21. Both series openings open on that portion of chamber 14, 15 which in the closed position of cut-off valve 16,17, lies on the front side, that is the side of head 16 relative to body 17. The openings 20 open on portion 14 of chamber 14,15 on the front side of rib 19 of head 16, when said cut-off valve lies in closed position. The openings 21 are smaller and open on portion 15 of chamber 14,15, but still barely on the front side of body 17, when the cut-off valve lies in closed position.

A second duct 22 extends length-wise through the cut-off valve 16,17. Said duct 22 which is free from any valve, thus brings at any time the supply and discharge duct 13 into communication with the backmost volume of chamber 14, 15, that is the chamber volume which lies on that side of cut-off valve 16,17 removed from duct 13.

Said backmost volume communicates with the inner side of tank 5 through a third duct 23 which runs lengthwise through tail 3 and the thicker end 4 thereof, and in said thicker end 4 said duct turns around to the right, in such a way that said duct opens next to tail 3, on that side removed from housing body 2 of said end 4, on the inner side of tank 5. In the location of said opening, the duct 23 narrows and such narrowing forms a seat for a valve 25 controlled by a float 24. A spring 26 mounted inside the end of duct 23 pushes said valve 25 in closed position when the valve 25 is not retained by float 24. When said float 24 which slidingly surrounds tail 3, lies in the lowermost position thereof, said float retains valve 25 open against the action of spring 26.

In that location where tail 3 merges into said thicker end 4, the third duct 23 is provided with a widening which forms a seat for a ball 27 of a one-way valve. A spring 28 presses said ball 27 against the seat and thus in the direction of housing 1,2. Said one-way valve can only let liquid through towards the inner side of tank 5 but not in the reverse direction. For the one-way valve to open, the pressure inside that portion of third duct 23 connecting to chamber 14, 15 has further to be higher than the sum of that pressure exerted by spring 28 and the pressure which prevails inside the other portion of said duct 23, which pressure is normally equal to the pressure inside tank 5.

Due to said one-way valve, the complete device may be used for filling as well as draining. The device operates thereby as follows:

When the liquid level inside tank 5 is lower than the adjusted maximum level, the float 24 lies in the lowermost position thereof and retains valve 25 open. When after opening cock 9, liquefied gas is fed through duct 8 to connecting part 6 with a pressure which is higher than the pressure which prevails inside tank 5, the cut-off valve 16, 17 is pushed to the open position against the action of spring 18. Liquefied gas flows mainly through duct 13 and openings 20 into tank 5. A portion of said liquefied gas also flows through duct 22, cut-off valve and by means of the backmost volume of chamber 14,15, through duct 23 into tank 5. The pressure of the liquefied gas being supplied is always higher than the sum of that pressure exerted by spring 28 on ball 27 and the pressure which prevails inside tank 5, so that the one-way valve formed by ball 27, is pushed open by said liquefied gas. Due to the rising liquid level inside tank 5, the float 24 rises and at some time said float does not retain the valve 25 in open position any more. Said valve 25 is closed by spring 26. As no liquefied gas can escape any more from duct 23 to tank 5, the pressure inside said duct 23 will rise progressively to the pressure of the liquefied gas being supplied. Due to the spring 18 pushing the cut-off valve to the closed position, still before the pressure inside duct 23 is equal to the pressure inside duct 13, the cut-off valve will be closed. Should rib 19 not be present on head 16 from said cut-off valve 16,17, such closing of the valve would occur when the difference between the pressure inside duct 13 and the pressure inside duct 23 is smaller than the pressure exerted by spring 18. Said rib 19 also insures that the pressure which prevails inside duct 13 is only exerted on that portion lying in front of rib 19, of said head 16 and not consequently on that side facing said head 16 of the portion projecting outside head 16, of the wider body 17. On said latter portion only acts through the openings 21, that pressure which prevails inside tank 5. The cut-off valve 16, 17 will consequently close when the pressure pressure inside duct 23 has reached such a value that the product of this pressure and the surface area of the back side of body 17, increased by the force exerted by the spring becomes higher than the sum of on the one hand the product of the filling pressure or pressure inside duct 13 and the surface area of the largest cross-section of the head 16, and on the other hand the product of the pressure inside tank 5 and the surface area of the front side of that portion projecting outside head 16, of body 17. As per definition the filling pressure is higher than the pressure inside tank 5, such condition is automatically fulfilled even before the pressure inside duct 23 is equal to the filling pressure. Due to the closing of the cut-off valve 16,17 any supply of liquefied gas to tank 5 is stopped. The liquid inside tank 5 has then reached the highest level thereof and float 24 lies in the position shown in the figure. The supply is thus automatically stopped and the highest level of liquid inside tank 5 cannot be exceeded. After closing of cock 9, the supply line which is connected to duct 8 can be removed.

When now the drain line which connects to duct 8, is opened and the cock 9 is also opened, the pressure inside the supply and discharge duct 13 of housing 1, 2, 3, 4 is lower than the gas pressure inside tank 5. Due to the presence of duct 22, said same lower pressure will also prevail inside the backmost volume of chamber 14, 15 and also inside that portion connected thereto of duct 23. The pressure inside said portion is naturally lower than the pressure inside tank 5 increased by that pressure exerted by spring 28 on ball 27, in such a way that the one-way valve formed by said ball is closed. The pressure inside tank 5 cannot consequently balance the lower pressure inside the backmost volume of chamber 14,15. The higher pressure from tank 5 prevails to the contrary actually inside that volume lying in front of body 17 around head 16 of said cut-off valve, of chamber 14, 15, in such a way that said volume communicates through openings 20 and 21 with the inner side of tank 5. It may be considered approximately that the surface area of the back side of body 17, whereon acts that lower pressure prevailing inside duct 13, is equal to that surface area as considered at right angle to the movement direction of valve 16, 17, whereon acts the higher pressure inside tank 5. The gas inside tank 5 thus exerts on the front side of valve 16, 17 a force which is higher than the force which is exerted by the pressure inside the backmost volume from chamber 14, 15 on the back side said valve. Quite rapidly after opening of cock 9, the force difference is even larger than the force exerted by spring 18, in such a way that the cut-off valve 16,17 is opened and gas can be drained from tank 5 through duct 13.

Figure 2:
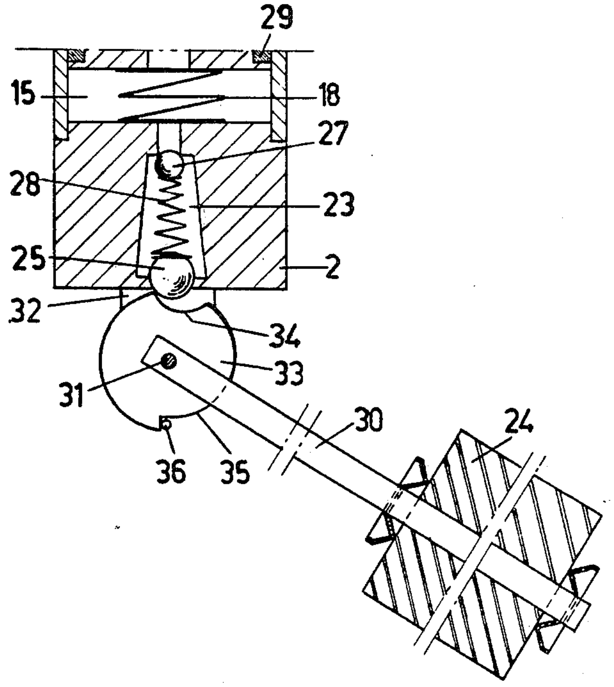
FIG. 2 shows a cross-section through part of a variation of the filling device as shown in FIG. 1.

The filling and draining device as shown in FIG. 2, differs mainly from the above-described embodiment as shown in FIG. 1 in the housing having no tail 3 nor thicker end 4 thereof, but being comprised but of head 1 and body 2. The third duct 23 runs straight through the backmost end of body 2 and in said end is provided a widening. The one-way valve formed by ball 27 and that valve 25 controlled by float 24 are arranged respectively on the frontmost end, that is the end facing chamber 14, 15, and the backmost end from the widened portion of duct 23, and said valves are pushed by one and the same spring 28 against a seat which is formed by the widening end. Moreover, not only the one-way valve but also the valve 25 controlled by said float 24 is a ball-valve.

Said changed structure of the housing results from the float mechanism of the tank having no vertically alternating movable float 24 but rather a hingedly mounted float 24. As it appears from FIG. 2 wherein but the backmost part of the filling and draining device whith the valves 25 and 27 together with the float mechanism is shown, said float 24 is mounted on a lever 30. Said lever 30 is mounted with the free end thereof on a shaft 31 which is rotatingly received in an extension 32 of body 2. Said valve 25 is so arranged on the end of the widened portion of duct 23 that when the ball bears on the seat thereof, said ball projects partly out of the body 2. Said ball can be pushed away from the seat thereof by means of a disk 33 which is provided on the circumference thereof with two recesses 34 and 35. In the rest position that is as the liquid level does not reach said float, the float 24 hangs directly below shaft 31. Said disk 33 then retains the ball-valve 25 away from the seat thereof. As the level inside the tank rises enough to drive the float, said disk 33 will rotate until the recess 34 lies vertically below the ball from valve 25. Said recess 34 is so large that the ball portion of valve 25 which projects outside body 2, can enter completely and thus also under the action of spring 28, the ball of valve 25 is pushed against the seat thereof. In FIG. 2, the float 24 is shown in that position where the recess 34 lies vertically below valve 25 and thus the ball of said valve is pressed by spring 28 on the seat thereof. The float 24 cannot move further upwards from this position because with said rotation of disk 33, a stop pin 36 mounted on said projection 32 has entered recess 35 in disk 33 and lies in said latter position of disk 33, at the end of said recess 35. The float 24 lies in this position for the highest liquid level inside said tank 5. When said liquid level falls, the float 24 goes down. The disk 33 pushes with the resulting rotation, the ball of valve 25 away from the seat thereof.

Said valve 25 acts in the same way as in the embodiment shown in FIG. 1. When the highest liquid level has been reached inside the tank, said valve 25 shuts off the duct 23, while with a lower liquid level the valve 25 lies in open position. As but the position but not the working of the one-way valve has been changed, the working of the filling and draining device a part of which is shown in FIG. 2, is similar to the working of the embodiment as shown in FIG. 1.

One and the same device may thus be used both for the filling and the draining. A separate device is no longer required, which makes the tank structure more simple.

The invention is in no way limited to the above-described embodiments and within the scope of the patent application, many changes may be brought to the described embodiments, notably as regards the shape, the composition, the arrangement and the number of the components which are used for embodying the invention.

Particularly the head of the cut-off valve does not have necessarily to be provided with a rib. Without a rib, it is not required to have two sets openings which bring into communication the chamber volume lying in front of the valve body with the inner side on the tank.

It is not also absolutely required that the one-way valve be a ball-valve. Among the two valves which form respectively the one-way valve and the float-controlled valve, as well in the embodiment shown in FIG. 1 as in the embodiment in FIG. 2, none, one or both valves may be formed by a ball-valve.

I claim:

1. A tank, particularly for liquefied gas, which comprises a wall defining an inner volume, a floating mechaninsm having a float arranged in said inner volume and a filling device mounted on the wall, which filling device comprises:

a. a housing mounted in the tank wall, which housing has a chamber and a supply duct opening with one end therein, b. a valve seat on the end of the duct, c. a cut-off valve which is arranged inside said chamber, which valve has:

a head cooperating with said valve seat and closing off said duct in the closing position, but still leaving free in said position a space about itself, said space extending to the closed duct, and a piston forming body which separates said space about the head from a backmost volume lying on that valve side removed from the duct, which valve is provided with a duct free from any valve, extending length-wise through the body and the head thereof, between the backmost chamber volume and an outlet in the head facing the supply duct, the housing being provided with at least one opening which brings the tank inner volume into communication with said space about the head and, in the valve open position, also with the supply duct, the housing being also provided with a duct between the backmost chamber volume and the tank inner volume, d. a spring which pushes the cut-off valve to the closing position, e. a valve which is controlled by the float mechanism and is mounted inside the duct between the backmost chamber volume and the tank inner volume and cuts off said duct when the liquid inside the tank has reached a determined level, and, f. a one-way valve which is mounted between said float mechanism-controlled valve and said chamber inside the housing, inside said duct between the backmost chamber volume and the tank inner volume, which one-way valve only lets fluid flow to the tank inner volume.

2. A tank as defined in claim 1, in which the piston-forming body of said cut-off valve is thicker than the head thereof, while the chamber inside said housing has a smaller portion for the valve head and a larger portion for the valve body, whereby the transition between both portions is so located that when the valve lies in closed position, the body still lies with the head-side projecting side some slight distance away from the transition from the small portion to the large portion of said chamber.

3. A tank as defined in claim 2, in which the head is provided over the whole circumference thereof with a rib which meets the chamber inner wall, said openig which opens on that chamber volume lying around said head, opens into said volume on the side of said supply duct relative to said rib in the closed position of the valve, while said housing is provided with at least one additional opening which on the other side relative to the rib, as considered in the closed position of the valve, opens on that chamber portion which lies on the head side relative to the body.

4. A tank as defined in claim 1, in which said one-way valve is a ball-valve.

5. A tank as defined in claim 1, in which the valve controlled by a float mechanism is a ball-valve.

6. A tank as defined in claim 1, in which the one-way valve and the valve controlled by the float mechanism have a common spring.

7. A tank as defined in claim 1, in which the housing comprises a part forming a center guide for the float of the float mechanism, which float is vertically slidable on the center guide.

8. Tank-mounted filling device as defined in claim 7, in which said duct wherein the one-way valve is mounted, runs cross-wise through said center guide.

* * * * *